Feb. 10, 1970   J. A. SCOTT, JR   3,495,086
SELECTIVE TARGET PHOTODETECTOR OF THE MATRIX TYPE
Filed June 13, 1967   4 Sheets-Sheet 1

INVENTOR.
JULIAN A. SCOTT, JR.
BY

Feb. 10, 1970   J. A. SCOTT, JR   3,495,086
SELECTIVE TARGET PHOTODETECTOR OF THE MATRIX TYPE
Filed June 13, 1967   4 Sheets-Sheet 2

INVENTOR.
JULIAN A. SCOTT, JR.
BY

INVENTOR.
JULIAN A. SCOTT, JR.

United States Patent Office 3,495,086
Patented Feb. 10, 1970

3,495,086
SELECTIVE TARGET PHOTODETECTOR OF THE MATRIX TYPE
Julian A. Scott, Jr., Rockville, Md., assignor to Scope Incorporated, Falls Church, Va., a corporation of New Hampshire
Filed June 13, 1967, Ser. No. 645,648
Int. Cl. H01j 39/12
U.S. Cl. 250—209                                       5 Claims

ABSTRACT OF THE DISCLOSURE

A photosensitive detector array having the detectors arranged in rows and columns, either as a matrix or in concentric circles, with either rows or columns or both being connected to a power source through a commutator. The electrical leads to the commutator are connected to one side of the detectors and the output leads are connected to the other side so that an output signal is dependent upon illumination of the detector. A comparator circuit selects the highest output above a preselected threshold.

---

This device relates generally to detectors and more specifically to photosensitive detectors for determining the location of various targets and eliminating location errors caused by multiple targets.

Many different types of detectors relating to photosensitive elements, and particularly infrared detecting devices, are in use today. Specifically, these detectors are designed to locate various targets of interest. In order to cover a wide field of view, these detectors have required either a large amount of hardware or high commutation rates which greatly increase the singal-to-noise ratio of the device.

Accordingly, it is an object of the present invention to provide a multi-element photosensitive detector which will greatly improve the signal-to-noise ratio available from large-field-of-view singe element detectors and at the same time greatly decrease the amount of hardware normally associated with multi-element detectors.

Additionally, it is an object of this invention to provide a continuous tracking of the "hottest" target imaged on the detector field with no biasing of the track signal by additional "cooler" targets imaged on the detector field.

These and other objects of the invention will become apparent from the following description when taken in conjunction with the drawings wherein.

Figure 1:
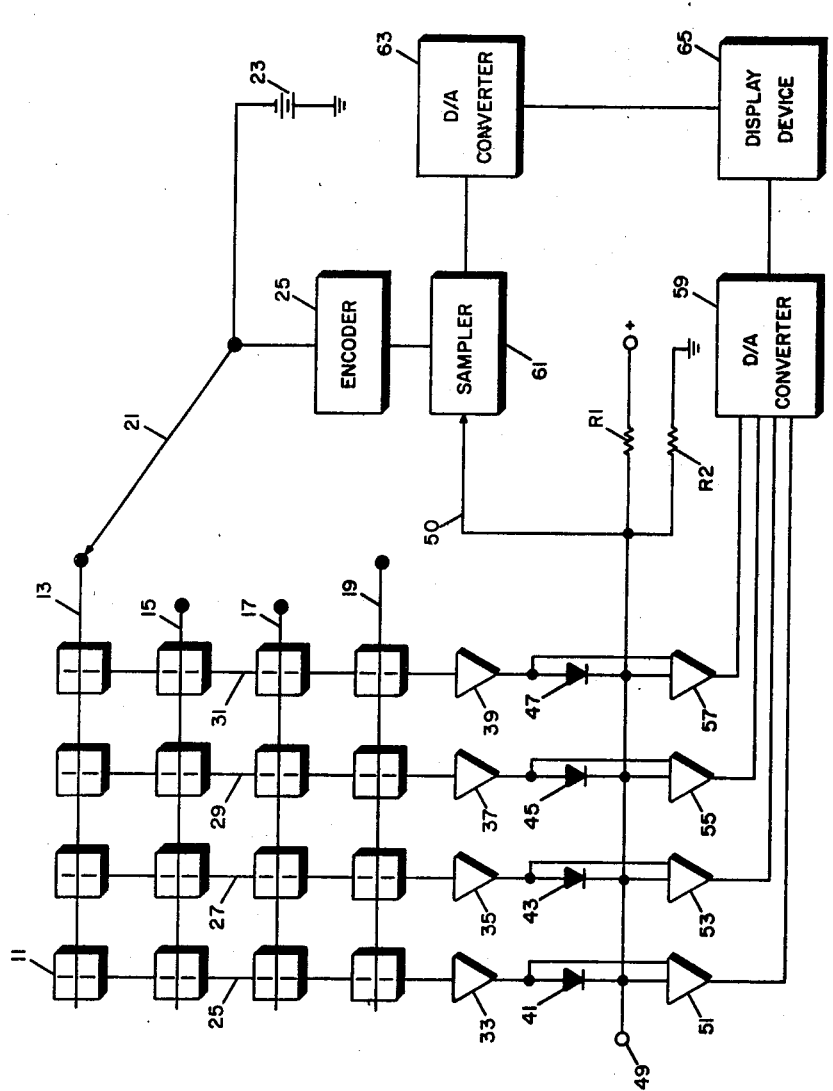
FIG. 1 is a schematic illustration of one of the simplest forms of the present invention.

Turning now specifically to FIG. 1, there is shown an array of photosensitive elements 11 which are arranged in a matrix having rows and columns. In the specific embodiment shown for purposes of illustration and description these photosensitive elements are considered to be IR sensitive elements such as an IR sensitive diode. However, various types of photosensitive elements could be used. It is to be understood that the term "row" and the term "column" are here used in order to more clearly describe the invention and that the particular devices associated with such rows and columns may be switched around so as to render the two terms interchangeable.

Associated with each of the rows are lead lines 13, 15, 17 and 19 which are connected to one side of each of the associated detectors 11 and terminate as indicated. A commutator means 21 is designated by the simple switching device, but would more probably be an electronic switching device so as to attain the speed and accuracy desired. The commutator is designed so as to pass from lines 13 through 19 in a selective time sharing basis. The commutator is connected to a source of power so that this power is connected to each of the rows of detectors when the commutator 21 is connected to the associated lead lines.

An encoder 25 is also connected to the commutator so as to provide a signal indicative of the position of the commutator at any particular instant of time for purposes which will become apparent as the description proceeds.

A group of leads 25, 27, 29 and 31 are connected in columnar fashion to the other side of the associated detectors as shown in FIG. 1. Therefore, when any one of the detectors are illuminated with infrared light waves, they will become conductive and if the commutator is connected to the particular lead associated with the illuminated detector, there will be an output along the particular leads 25 through 31.

The outputs from the columnar leads pass through preamplifiers 33, 35, 37 and 39 and selectively to the diodes 41, 43, 45 and 47. These diodes effectively present "OR" gates whose output is equal to the highest preamplifier output which exceeds the voltage threshold which is determined by the ratio of the resistors $R_1$ and $R_2$. The maximum output of one of the diodes is available at terminal 49 and is representative of radiometric information which may be used for many possible purposes. This information represents the absolute intensity of any detected object.

Additionally, the "OR" gate output is available through lead 50 and is used together with the data from the encoder 25 as an input to a sampling device 61 which insures a properly timed output of the information relating the position of the commuator and the output of the "OR" gate. This information is supplied to the digital to analog converter 63.

The ultimate output of the "OR" gates is delivered to an equivalent number of comparator amplifiers 51, 53, 55 and 57. The outputs of these amplifiers are delivered to a digital analog converter 59 for providing an input to the ultimate display device 65 which converts both the information from converter 59 and converter 63 so as to display the image target in whatever fashion desired.

In operation, an infrared detector 11 is located at each conductor intersection so as to provide the matrix as shown in FIG. 1. Each row conductor is connected to one side of an associated series of IR sensitive elements in a particular row and to one pole of the commutator 21. Each column conductor is connected to the other side of an associated series of detector elements in that particular column and to the inputs of high input impedance D.C. coupled amplifiers 33 through 39. The effect of such an arrangement is that every infrared sensitive element in the matrix acts as an open circuit except for the element in the row which is biased by the commutator connection. Therefore, each preamplifier is being driven by a single element in the biased row and the output of each preamplifier is a voltage proportional to the radiometric intensity of the signal being focused on the particular associated detector element.

The preamplifier outputs drive an analog "OR" gate when the output is equal to the highest preamplifier output which exceeds a voltage threshold determined by the ratio of resistors $R_1$ and $R_2$. This maximum preamplifier output voltage, or the threshold voltage when all preamplifier outputs are below the threshold, drives the "inhibit" input of a voltage comparator circuit associated with each matrix column. The "enable" input of each comparator is driven by its associated preamplifier. Under these conditions, a comparator may be "enabled" when, and only when, its "enable" input is being driven by a maximum preamplifier output and the preamplifier output exceeds the threshold voltage.

The voltage corresponding to the maximum radiometric intensity is available at the "OR" gate output 50 in sampled format with sample width dependent upon the dwell time of the commutator and the sample frequency dependent upon the commutator cycle time.

Although the description and the associated drawing illustrated in FIG. 1 disclose a four-by-four detector matrix, the technique herein described may be applied to matrices and elements of almost any size and configuration. A particular advantage of the proposed device is that the field of view for each element may be based on required signal-to-background-noise ratio, and the number of elements may be determined by the required total field of view. Additionally, the amount of amplifier and commutator hardware may be determined by the resolution required in the total field of view. Election of these three parameters may be completely independent from each other.

Figure 2:
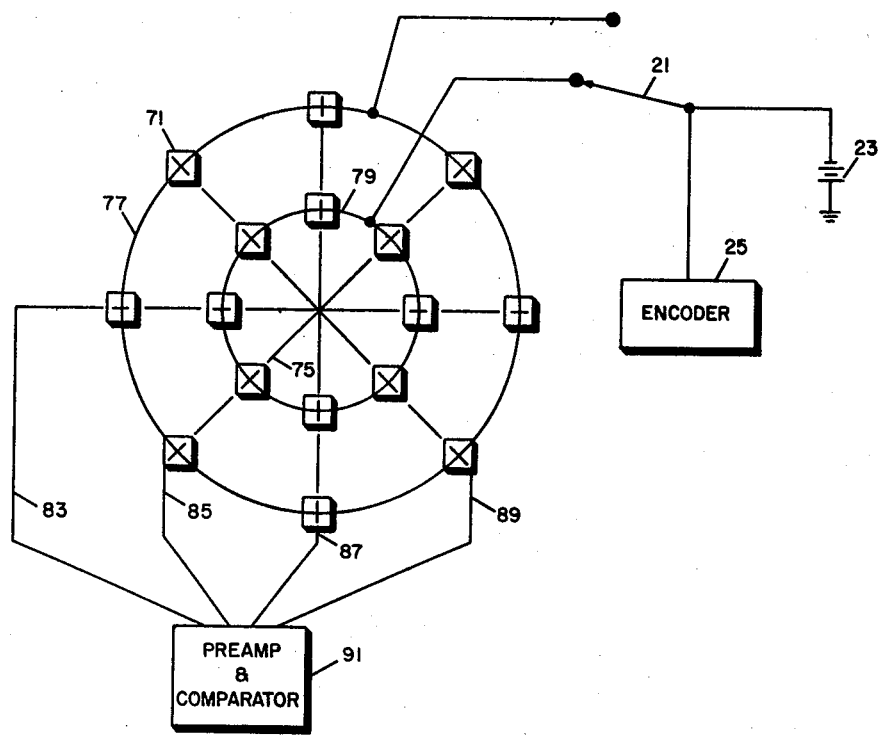
FIG. 2 is a modified array of the device of FIG. 1.

FIG. 2 illustrates a concept similar to FIG. 1 with the exception that the detectors 71 are arranged in concentric circular rows such as illustrated by the lead lines 77 and 79. These concentric rows may be connected to a pole of the commutator 21. Additionally, the detectors 71 are arranged such that they appear in radial columnar lines so that they may be connected by the leads 83, 85, 87 and 89 to the preamplifier and comparator circuits 91 as indicated. Thus, it will be obvious that by scanning outwardly, the same type of result may be accomplished with a different structural embodiment.

The system as shown and described in FIG. 1 provides a scanning technique in which the data output of the hottest target in each row of the sensor matrix is available on a time-shared basis. However, a "hot" target would mask a "cooler" target focused on another element in the same row of the matrix even though the "cooler" target would not bias the location information for the "hot" target. This situation may be acceptable for certain operational requirements. However, in other requirements it is advantageous to receive and display information relative to more than one target in a particular row.

Figure 3:
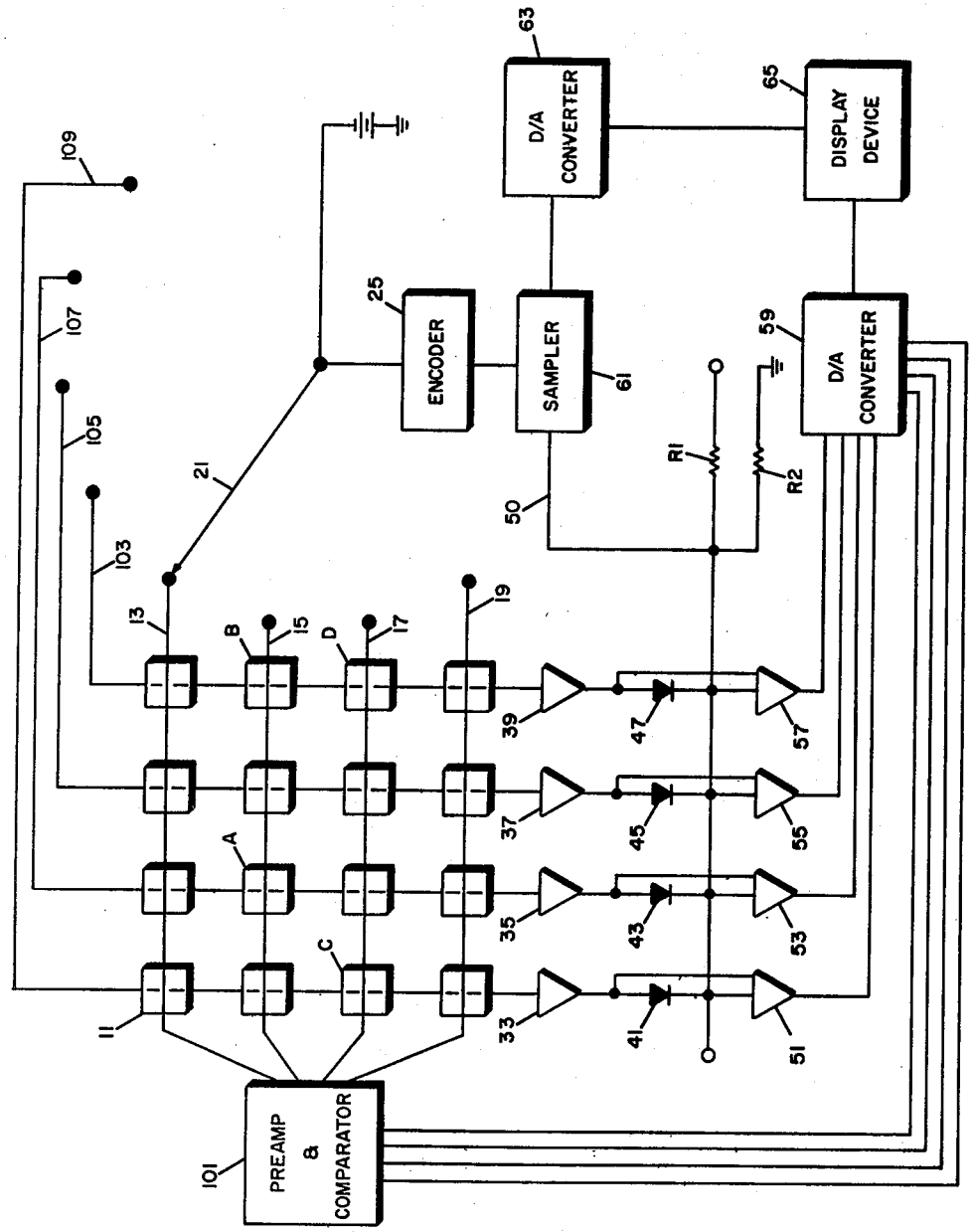
FIG. 3 is a schematic illustration of a further modification of the present invention.

Turning now to FIG. 3 there is shown a block diagram which may be used when it is required that data output be obtained on several targets within one field of view. Again, like numbers are assigned to like parts as shown in FIG. 1.

In this embodiment the preamplifier and comparator electronics are similar to those described in FIG. 1. However, in FIG. 2 the system has been modified so as to include preamplifier and comparator 101 for the matrix rows and leads 103, 105, 107 and 109 to the commutator 21 for the matrix columns. With this arrangement, the "cooler" targets which were orginally masked by the "hotter" targets in FIG. 1 will now become apparent when the matrix columns are scanned by the commutator. With the arrangement as shown in FIG. 3, the "cooler" targets will be masked only when "hotter" targets lie in both the same row and column as defined by the matrix location of the "cooler" target.

Figure 4A:
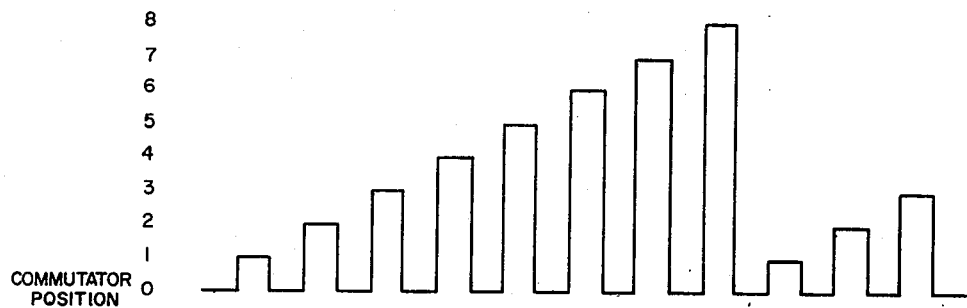
FIGS. 4a, 4b and 4c are graphic representations of an illustrative output of the device of FIG. 3.
Figure 4B:
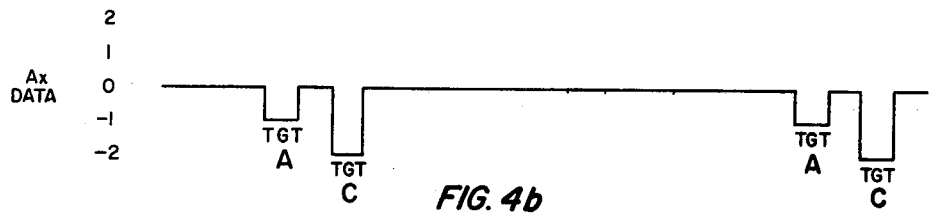
Figure 4C:
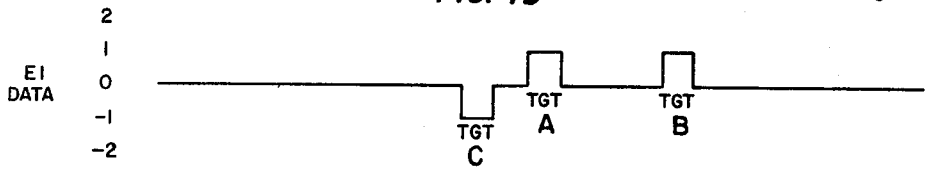

FIG. 4 illustrates the above operation. FIG. 4a is illustrative of the commutator position while FIG. 4b is illustrative of the output of the columnar data and FIG. 4c is illustrative of the output of the row data from preamplifier and comparator 101.

As a specific example, it will be presumed that there are targets in decreasing order of signal magnitude located at positions A, B, C and D as indicated. Under these conditions, and with the commutator moving in a timed fashion, target radiometric data is available at the indicated times. It will be noted that one and only one target, that is target D, is masked by the "hotter" targets in both the row and column associated with target D. Additionally, it is noted that radiometric data is available from targets A and C twice for each commutator cycle while target B is masked by target A during the row commutation.

It will be obvious that the above description and associated drawings are illustrative only and the number of elements together with the type of elements and the particular arrangement thereof may be varied in accordance with specific requirements and needs. It is also noted that commutator scanning could be provided for only one sector of an array by rearranging the lead lines to meet the desired result. Accordingly, this invention is to be limited only by the scope of the following claims.

I claim:
1. A target detector comprising
   a plurality of photosensitive elements arranged so as to form an array,
   a first group of conductors, each of said conductors being connected to one side of a preselected number of said photosensitive elements,
   commutator means for selectively energizing each of said first group of conductors,
   a second group of conductors, each of said second group of conductors being connected to the other side of a preselected number of said photosensitive elements, said second group of conductors being activated when the associated photosensitive cell is conductive and the associated conductor of said first group of parallel conductors is energized by said commutator,
   encoder means for providing a signal representative of the position of said commutator means,
   display means responsive to the output of said encoder means and said second group of conductors, and
   means for selecting only those targets representative of a predetermined energization of each individual photosensitive element.

2. The detector of claim 1 wherein said array is in a pattern of rows and columns of photosensitive devices, each conductor of said first group of conductors being connected across a different row of said devices,
   each conductor of said second group of conductors being connected across a different column of said devices.

3. The detector of claim 1 wherein the means for selecting the targets comprises,
   a plurality of "OR" gates connected to said column so that the output therefrom will be only from the gate having the highest input.

4. The detector of claim 1 wherein said array is in a pattern of concentric circular rows of said photosensitive devices with groups of said devices being in radial columnar alignment.

5. The detector of claim 1 further comprising
   means connected to said commutator means for selectively energizing said second group of conductors, and
   means for providing the output of said last named means to said display means.

References Cited

UNITED STATES PATENTS

| 2,895,079 | 7/1959 | Williard | 315—153 |
| 2,928,975 | 3/1960 | Williams | 313—108 |
| 3,121,861 | 2/1964 | Alexander | 340—173 |
| 3,191,040 | 6/1965 | Critchlow | 250—209 |

JAMES W. LAWRENCE, Primary Examiner

C. R. CAMPBELL, Assistant Examiner

U.S. Cl. X.R.

250—208; 315—153, 155, 166; 340—166, 173